United States Patent [19]
Vandagriff

[11] Patent Number: 5,156,434
[45] Date of Patent: Oct. 20, 1992

[54] ADJUSTABLE SUN VISOR

[76] Inventor: Craig Vandagriff, 24637 Gardenstone La., West Hills, Calif. 91307

[21] Appl. No.: 791,919

[22] Filed: Nov. 12, 1991

Related U.S. Application Data

[63] Continuation-in-part of Ser. No. 527,132, May 22, 1990, abandoned.

[51] Int. Cl.$^5$ .............................................. B60J 3/02
[52] U.S. Cl. .................................. 296/97.8; 296/97.12
[58] Field of Search ................... 296/97.8, 97.9, 97.12; 160/DIG. 3, 370.2

[56] References Cited

U.S. PATENT DOCUMENTS

| | | | |
|---|---|---|---|
| 2,517,872 | 8/1950 | Hamel | 296/97.8 X |
| 2,596,873 | 5/1952 | Solmes | 296/97.8 |
| 4,810,023 | 3/1989 | Kawada | 296/97.8 |
| 4,858,982 | 8/1989 | Dykstra et al. | 296/97.8 X |
| 4,950,021 | 8/1990 | Vandagriff | 296/97.8 X |

Primary Examiner—Margaret A. Focarino
Assistant Examiner—Andrew C. Pike
Attorney, Agent, or Firm—Poms, Smith, Lande & Rose

[57] ABSTRACT

An adjustable sun visor for a vehicle has a main body portion with a first panel movable laterally away from a first compartment in the main body portion. A second panel is movable downwardly and linearly out of a second compartment in the main body portion below the first compartment. A third panel is movable into a third compartment in the main body portion nesting therein and also rotatable in both a clockwise and counterclockwise direction.

8 Claims, 3 Drawing Sheets

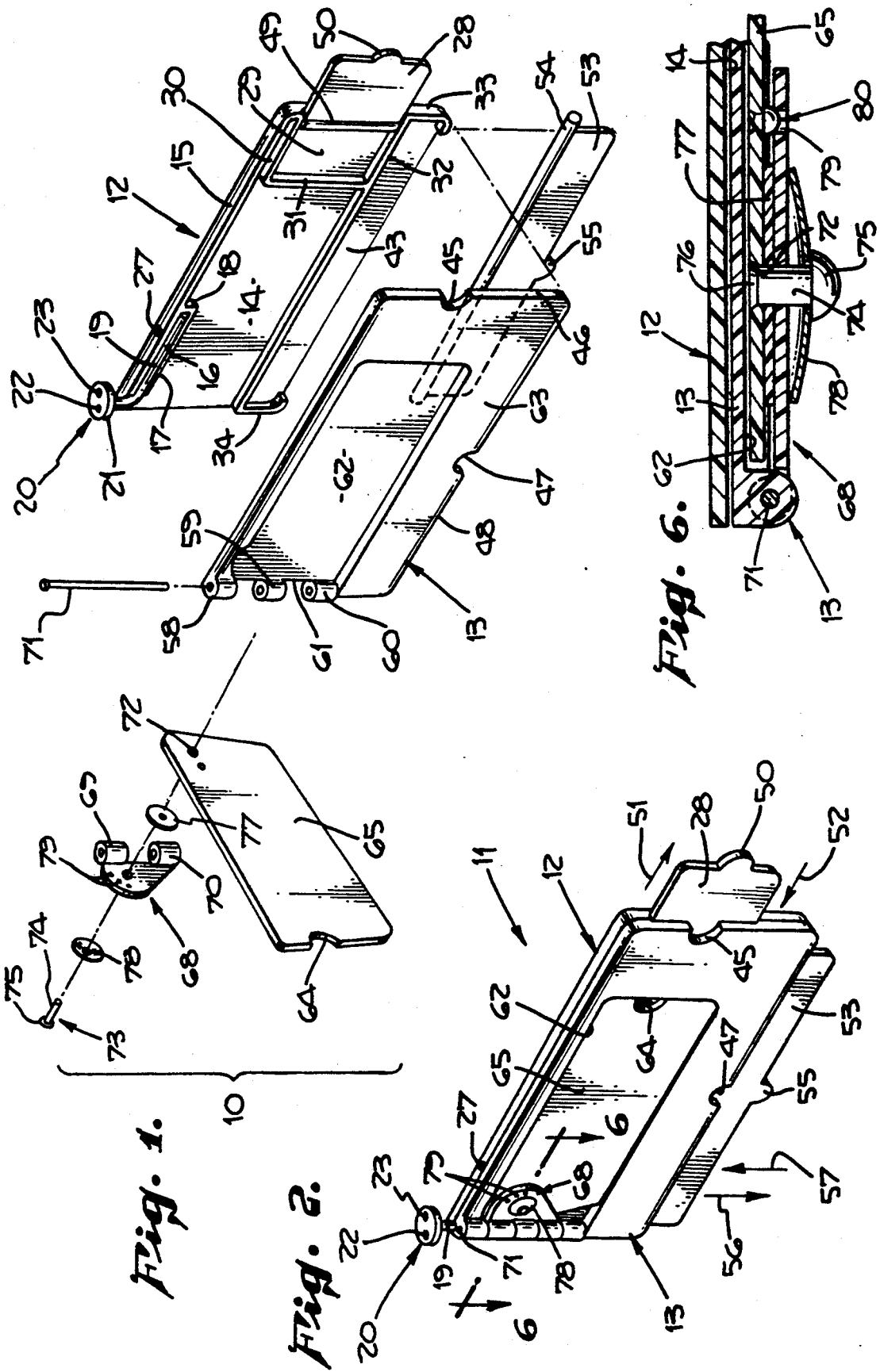

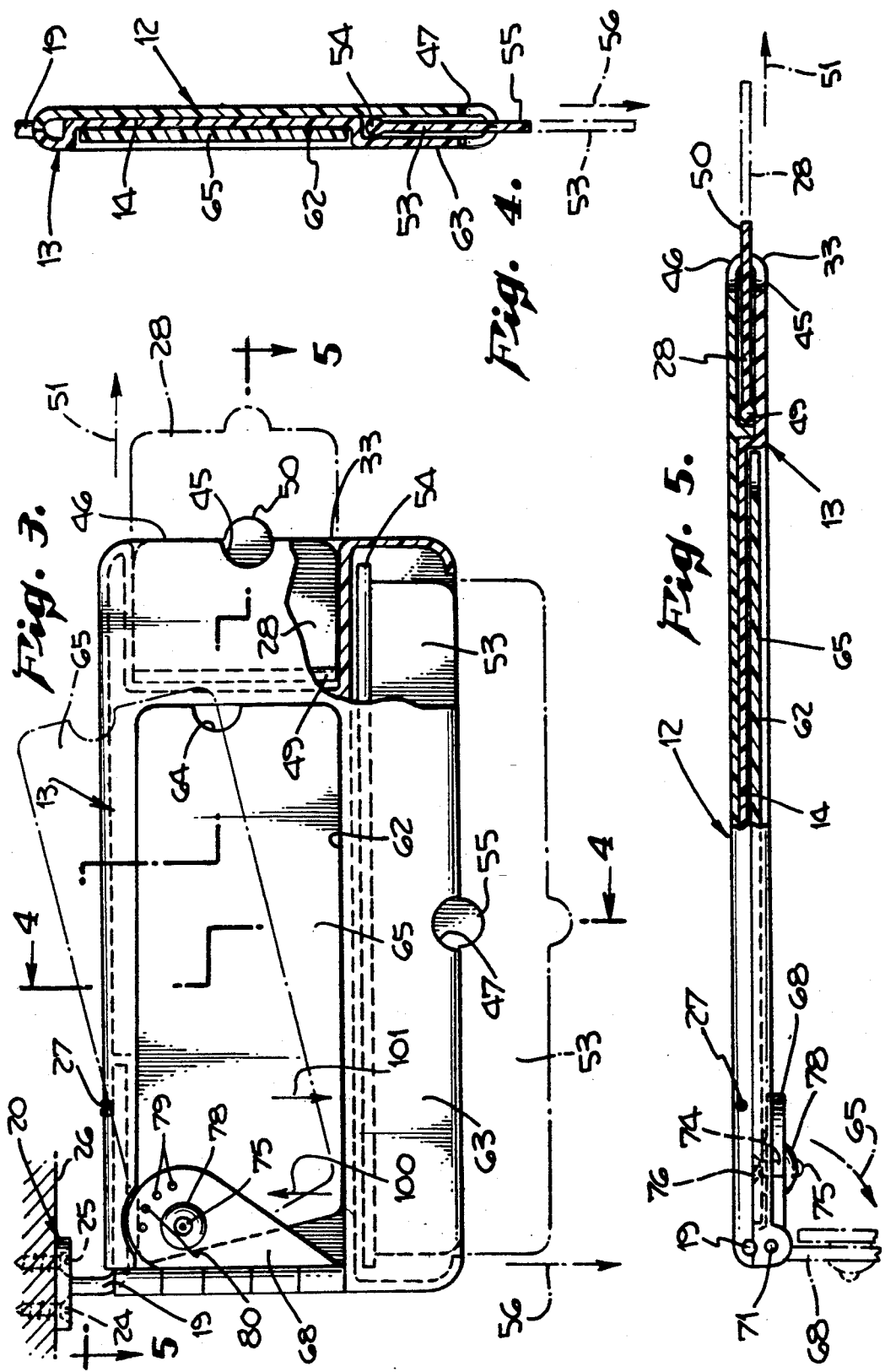

ADJUSTABLE SUN VISOR

RELATIONSHIP TO CO-PENDING APPLICATIONS

This application is a continuation-in-part of application Ser. No. 07/527,132, filed May 22, 1990, now abandoned.

BACKGROUND OF THE INVENTION

1. Field of the Invention

The invention relates to sun visors; and, more particularly, to a multi-adjustable sun visor for a vehicle to provide a variety of adjustments.

2. Description of the Prior Art

Many devices have been proposed in the past for shielding the sun's rays from the eyes of drivers and their passengers. Almost all vehicles have a visor that swivels outwardly and downwardly from the roof or mounting of the vehicle. Such visors only cover a limited area and it is difficult to swing or pivot the same to block substantially all directions of the sun's rays. For example, there is a space between the driver's visor and the passenger's visor that is not generally covered by either visor. Although many attachments have been suggested in the past, no visor is known which includes a panel which can be swung outwardly and be rotated to a variety of positions, yet simultaneously provide for longitudinal, side, and vertical extension of the visor.

SUMMARY OF THE INVENTION

It is an object of this invention to provide a sun visor for a vehicle which can be adjusted longitudinally, vertically, and swung out to provide side blockage with angular circular adjustment.

It is a further object of this invention to provide such an adjustable sun visor which can be fixed in a plurality of spaced angular positions.

These and other objects are preferably accomplished by providing an adjustable sun visor for a vehicle. The adjustable sun visor is adjustable both longitudinally, downwardly, and in a circular relationship. The adjustable sun visor includes a panel section that can be swung away from the mounting of the main body portion of the sun visor for such circular adjustment.

BRIEF DESCRIPTION OF THE DRAWINGS

FIG. 1 is an exploded view of a sun visor in accordance with the invention mounted on the conventional driver's side of a vehicle;

FIG. 2 is a perspective assembled view of the visor of FIG. 1.

FIG. 3 is a plan view, partly in section, of the visor of FIGS. 1 and 2;

FIGS. 4 and 5 are views taken along lines 4—4 and 5—5 of FIG. 3;

FIG. 6 is a view taken along lines 6—6 of FIG. 2;

DESCRIPTION OF THE PREFERRED EMBODIMENT

Figure 7:
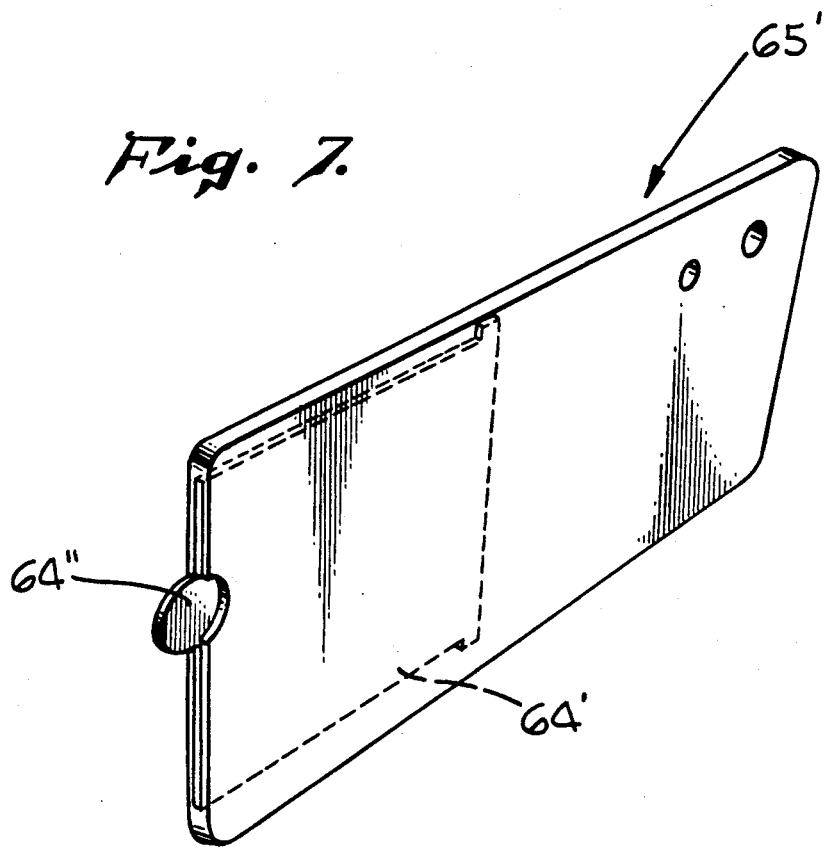
FIG. 7 is a perspective view of a modification of one of the panels of the embodiment of FIGS. 1 to 6.

Referring now to FIG. 1 of the drawing, an adjustable sun visor 10 is shown having a main body portion 11 (FIG. 2) comprised of two main body portion parts 12, 13. Parts 12, 13 are adapted to be secured together in any suitable manner, such as by gluing. Of course, they can be snap fit together but in any event sandwich the parts to be discussed hereinbelow therebetween.

Rear body portion part 12 has a flat planar portion 14 and a peripheral inwardly extending flange 15. An elongated slot or channel 16 is provided on part 12 by a flange 17 spaced from flange 15 closed off at the inner end by wall 18. The elongated leg 19 of an L-shaped pivot pin or rod 20 is received within channel 16. Rod 20 has an enlarged head 21 adapted to be secured or the like via holes 22, 23 and screws 24, 25 received respectively therein (see FIG. 3) into the roof 26 of a vehicle.

Leg 19 may be press-fit into channel 16 but, to prevent ready removal, a set screw 27 (FIGS. 1 and 3) may be threaded through a threaded hole in flange 15 and into engagement with leg 19 to prevent removal and to maintain rod 20 in a tight relationship with visor 10.

Flange 15 extends along the top of visor 10, then curves downwardly a short distance at the right end in FIG. 1. A rectangular chamber or cavity 29 is provided in visor 10 for receiving side panel 28 therein. Side panel 28 is slidable into rectangular cavity 29 defined by a first upper horizontal flange 30 (spaced from flange 15), and a second vertical flange 31 connected to flange 30 extending downwardly therefrom to an elongated lower horizontal flange 32. Flange 32 extends to the right in FIG. 1 to engage a curved flange 33 (which is a continuation of flange 15) and to the left in FIG. 1 to a vertical curved flange 34 (similar to flange 33).

As seen in FIG. 5, panel part 13 is flat on its inner surface, thus closing off cavity 43 in a flange part 12 (FIG. 1) when part 12 is assembled to part 13. Cavity 43 is thus defined by the mating parts 12, 13.

The mating parts 12, 13 also close off cavity 29 in part 12 when part 12 is assembled to part 13. Part 13 also has a semicircular cutout portion 45 along edge 46 as seen in FIG. 1. Part 13 further has a semicircular cutout portion 47 along lower edge 48.

Panel 28 (FIG. 1) has an enlarged bead 49 at one end and a semicircular tab 50. As seen in FIG. 2, when panel 28 is trapped between parts 12, 13, tab 50 can be grasped to pull panel 28 out of compartment 29 in the direction of arrow 51. The spacing in compartment 29, when closed off by the wall of part 13, is such that bead 49 friction fits therebetween and thus can be quickly and easily pulled out in the direction of arrow 51 or pushed inwardly in the direction of arrow 52. Of course, other means may be provided for pulling panel 28, such as indent thereon in place of tab 50 to facilitate grasping.

In like manner, a lower panel 53 is provided generally conforming to compartment 43 (when closed off by panel 13) having an elongated bead 54 and an pull tab 55 (see also FIG. 2). Bead 54 is thus frictionally fit in the spacing in compartment 43 between parts 12, 13 and this can quickly and easily be pulled out of compartment 43, in the direction of arrow 56 (FIG. 2) or pushed inwardly in the direction of arrow 57.

Part 13 has three spaced apertured bosses 58 to 60 along edge 61 (FIG. 1). Part 13 also has an elongated generally rectangular compartment 62 provided in side 63. A rotatable panel 65 having a semicircular cutout section 64 along one side thereof is provided having a generally rectangular configuration conforming to compartment 62. As seen in FIG. 2, panel 65 is adapted to fit into compartment 62 and conform thereto (see also FIG. 4).

A generally triangularly shaped flange 68 (FIGS. 1 and 2) is fixedly secured to panel 65. Flange 68 has a pair of integral apertured spaced bosses 69, 70. Boss 69 conforms to the spacing between bosses 58, 59 and boss 70 conforms to the spacing between bosses 59, 60 and is received therebetween as seen in FIG. 2, with headed pivot pin 7i extending into the aligned apertures in bosses 58 to 60 and 69, 70 to retain flange 68 to part 13.

Panel 65 has an aperture 72 therein and flange 68 is secured to panel 65 by a rivet 73 (see also FIG. 5). Rivet 73 has a shank 74 and an enlarged head 75. Shank 74 extends through aperture 72 in panel 65 and is enlarged or deformed at 76 (FIG. 5). A teflon washer 77 (see also FIG. 6) may be provided between panel 65 and flange 68 to provide for frictionless movement. A generally circular convex spring washer 78 (FIGS. and 6) is provided receiving shank 74 therethrough (shank 74 also passing through a suitable aperture in washer 77) with enlarged head 75 abutting against the exterior of spring washer 78. A plurality of spaced holes in a generally circular array 79 are provided about the flange 68 (see also FIGS. 1 and 2) adapted to align with a rivet 80 (FIG. 6) on panel 65. As seen in FIG. 5, panel 65 can thus be swivelled or rotated from the solid line position to the dotted line position to vary the angle of panel 65. The spring bias of washer 78 allows panel 65, coupled to flange 68 via rivet 73, to be moved slightly away from flange 68 (due to the bias of spring washer 78) and be rotated up or down in the direction of arrows 100, 101, respectively, as seen in FIG. 3, when panel 65 is in the FIG. 5 position. Thus, rivet 80 enters one of the apertures or holes 79 aligning with rivet 80, the latter snapping into the same as seen in FIG. 6. This retains the panel 65 in the desired up or down angular position and provides indexing means for indexing panel 62 about flange 68.

In operation, visor 10 is mounted to rod 20 of the vehicle's roof 26 via mount 21. Although shown in FIG. 2 as mounted to the driver's side of the vehicle, obviously visor 10 may be mounted to the passenger's side, if desired, by mere reversal of parts 12, 13. As seen in FIG. 2, panel 28 can be moved in the directions of arrows 51, 52 in and out of visor 10 (see also FIGS. 4 and 5). Panel 53 can be moved (FIG. 2) in the directions of arrows 56, 57 in and out of visor 10. Panel 65 can be pivoted or swung out of cavity 62 about pin 71 to the dotted line position shown in FIG. 5. Panel 65 can then be rotated via spring washer 78 and rivet 73, as heretofore described, to the rotatable position (or a variety of positions as provided by rivet 80 and holes 79). Thus, panel 65 can provide side window blockage or sun shaded. This provides for a wide variation in side window blocking of the sun and thus makes visor 10 quite versatile. The normal position of visor 10 is shown in solid lines of FIG. 3 with the panels 65, 28 and 53 in the normal stored position.

Figure 8:
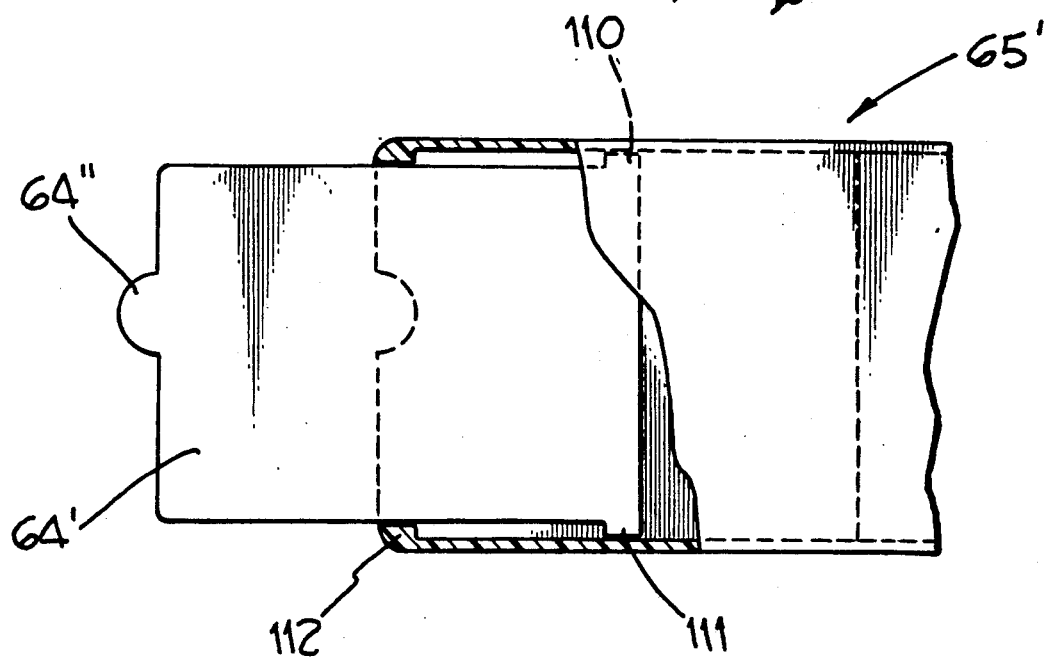
FIG. 8 is a vertical view of the panel of FIG. 8.

Although panel 65 is shown in FIG. 1 as being a single planar element, as seen in FIG. 7, panel 65', otherwise identical to panel 65 and mounted similarly in the structure of FIG. 1, has a pull out panel 64', similar to panel 28, which can be grasped at tab 64" and pulled out as seen in FIG. 8, flanges 110, 111 abutting against the interior of end wall 112 to prevent full withdrawal thereof.

Any suitable materials may be used. Panels 28, 53, and 65 may be of an opaque plastic material for blocking or shading the sun's rays. Any suitable means may be used for interconnecting the parts to provide means for swivelling panel 65 away from part 13. Obviously, other means may occur to the artisan for providing rotation of panel 65 with respect to flange 68 and retaining panel 65 in a fixed rotated position.

There is thus disclosed a unique and novel multi-adjustable visor which can be adjusted for rotation and sun blocking in various directions.

I claim:

1. A sun visor for a vehicle comprising:
 a first main elongated body portion part (12) having a first cavity (29) therein receiving a first panel (28) therein, said first panel (28) being movable from a first position disposed within said first cavity (29) to a second postion extending laterally out of said first cavity (29),
 said first main elongated body portion part (12) having a second cavity (43) therein below said first cavity receiving a second panel (53) therein, said second panel (53) being movable in a direction downwardly and linearly away from said first cavity (29) from a first position disposed wtihin said second cavity (43) to a second position extending out of said second cavity (43); a second main elongated boyd portion part (13) secured to said first main elongated body portion part (12) sandwiching said first and second panels (28, 53) therebetween, said second main elongated body portion part (13) having an elongated generally rectangular compartment (62) therein on a side (63) of said second main elongated body portion part (13) disposed away from said first main elongated body portion part (12); and a third elongated panel (65) disposed in said compartment (62) and conforming thereto, said third panel (65) being movable from a first position disposed within said compartment (62) to a second position extending away from said compartment (62), said third panel (65) nesting inside of said compartment (62) when in said first position thereof, said third panel (65) being pivotally connected to a flange (68) along one edge thereof by spring biased mounting means (78, 73, 72), whereby said third panel (65) can be rotated in both a clockwise and a counterclockwise direction about said flange (68) with said spring biased mounting means (78, 73, 72) retaining said third panel (65) in position against said flange (68) when released from rotation.

2. The visor of claim 1 wherein said first and second panels (28, 53) frictionally fit within the respective cavities (29, 43).

3. The visor of claim 2 further including an elongated channel (16) in said first main body portion part (12) along one edge thereof providing pivot rod receiving means adapted to receive an elongated leg (19) of a pivot rod (20) therein for mounting the visor to a roof of the vehicle.

4. The visor of claim 3 further including cooperating indexing means (79, 80) on said third panel (65) and said flange (68) for indexing said third panel (65) to said flange (68) in a plurality of differeing positions thereby allowing said third panel (65) to be fixed in one position of the plurality of the differing positions on said flange (68).

5. The visor of claim 4 wherein said indexing means (79, 80) includes a rivet (80) on said third panel (65) and a plurality of spaced holes (79) in a generally circular array of said flange (68), said rivet (80) snapping into any one of said spaced holes (79) to thereby retain the third panel (65) in said one position on said flange (68).

6. The visor of claim 1 wherein said flange (68) is pivotally connected to said second main elongated body portion part (13) along one edge (61) thereof.

7. The visor of claim 6 wherein said flange (68) is pivotally connected to said second main elongated body portion part (13) by spaced apertured bosses (58, 59, 60) on said edge (61) receiving therebetween like spaced apertured bosses (69, 70) on said flange (68), apertures in said bosses (58, 59, 60, 69, 70) being in alignment and receiving a pivot pin (71) therein.

8. The visor of claim 1 wherein said third elongated panel (65') includes an inner panel (64') telescopingly mounted in said third elongated panel (65') and movable from a first position inside of said third elongated panel (65') to a second position extending out of said third elongated panel (65').

* * * * *